Patented Oct. 21, 1947

2,429,398

UNITED STATES PATENT OFFICE 2,429,398

HORMONE EXTRACTS

Arthur Stanley Cook, Outremont, and Gordon A. Grant, Montreal, Quebec, Canada, assignors, by mesne assignments, to Ayerst, McKenna & Harrison, Limited, New York, N. Y., a corporation of New York No Drawing. Application May 23, 1944, Serial No. 536,960. In Canada August 20, 1943

12 Claims. (Cl. 167—74.5)

This invention relates to new and useful therapeutic substances having oestrogenic and other biological activity and to their preparation.

It is a principal object of the present invention to provide substances of this nature having high oral activity. It is a further object of the invention to provide substances of this nature which are stable. It is a further object to provide a process for deriving these substances.

With these and other objects in view, the applicants have prepared a water soluble therapeutic substance containing substantially all the water-soluble oestrogenic activity of the urine of the pregnant mare and of stallion urine and also possessing other biological activity. This substance has high oral activity in the treatment of menopausal conditions, is therapeutically non-toxic, and is stable.

According to a preferred procedure, liquid containing the desired hormones is treated while still fresh and thus unhydrolyzed, or is first suitably preserved to prevent hydrolysis and then treated. In this condition, the liquid is contacted with a suitable adsorbent, so as to adsorb thereon the active principles. These principles are then removed from the adsorbent with an agent capable of effecting substantially optimal elution. Steps are taken throughout the process to prevent hydrolysis of the material containing the active principles, e. g. by adjusting the pH to a suitable level, for instance, substantially neutral to weakly alkaline. Water-insoluble impurities can be removed by special washing, for instance, employing benzol and ether. The resulting product is an aqueous concentrate containing substantially all the water-soluble oestrogenic potency and only about 1 to about 2% of the original solids of the starting liquid.

In these procedures, various adsorbents may be employed, as for instance, charcoal, calcium triphosphate and fuller's earth, with charcoal preferred. The eluting agents effective to remove the potency from the adsorbent are selected from the group of organic nitrogen-containing bases. A wide variety of organic nitrogen-containing bases may be used with satisfactory results, for instance, pyridine, aniline, morpholine, quinoline, monoethylamine, normal butylamine, normal amylamine. These bases are preferably employed in aqueous solution.

The invention will be understood in greater detail by reference to the following examples which are merely illustrative and should not be taken in a limiting sense.

EXAMPLE 1

About 25 gallons of urine freshly obtained from pregnant mares and containing water-soluble oestrogenic activity occurring in unhydrolyzed form were preserved with an alcohol chloroform mixture.

About 560 grams of activated charcoal was added and the mixture stirred mechanically for about 15 minutes at a suitable temperature, e. g. between about 15° C. and about 30° C. The charcoal was filtered off. The urine filtrate was retreated with charcoal. The charcoals were combined. Substantially all the water-soluble oestrogenic substances had been removed from the urine. In one procedure the charcoal was then dried, in another it was left wet. In certain cases it is desirable to carry out procedural steps including final purification of the product at some place other than that where the equine urine is collected and concentrated and it is obviously advantageous to transfer the concentrated urinary material in the adsorbent in the dry state. On a comparison of the procedures operating with wet and with dried adsorbent, it was found that no appreciable loss of oestrogenic activity occurred on drying the adsorbent before proceeding with the remaining steps.

About three liters of an aqueous solution containing about 90% pyridine was added to the charcoal (dry or wet) and mixed thoroughly at about room temperature. This mixture was stirred and then allowed to stand in the refrigerator several hours. The charcoal was then filtered off and resuspended in about two liters of fresh pyridine solution (about 90%). It was allowed to stand for several hours with occasional stirring. The charcoal was then filtered off. The charcoal was suspended again in about two liters of pyridine solution and then sucked dry.

The pyridine extract and washings obtained in the above manner, amounting now to about eight liters were combined and concentrated in vacuo at a low temperature between about 40° C. and about 50° C. to 250 cubic centimeters. During the final stage of preparation in which the pyridine was being removed and the aqueous concentrate obtained, the reaction of the mixture was not allowed to become acid. About 250 cubic centimeters of water were added. This solution contained substantially all the water-soluble oestrogenic substances of the original urine and possessed adrenal cortical-like activity.

The mixture was then washed with about two volumes of benzol. The pH of the water solution was adjusted to a value of about 8. It was washed about three times with about one-third the volume of ether. The benzol and ether washes removed benzol- and ether-soluble substances but only negligible amounts of the water-soluble oestrogens. The aqueous concentrate, about 500 cubic centimeters (freed from ether) contained the conjugated oestrogenic hormones. The total solids occurring in the concentrate amounted to less than about 2% of the total solids present in the original urine.

The concentrate obtained contained substantially all the water-soluble oestrogenic substances of the original pregnant mares' urine. For instance, concentrates have contained over about 95% of the total water-soluble oestrogenic substances of the original urine. These substances were stable in the form of the concentrate (or as a desiccated powder—especially in vacuo) for a considerable period. As an additional precaution against hydrolysis of the free oestrogens, phosphate buffer pH 7.5 may be added.

The oestrogenic substances were partly present as water-soluble sulphates and in certain cases as much as about 60% of the total water-soluble oestrogenic substances were isolated as oestrone sulphate in the form of its pure quinidine salt from concentrates obtained from suitable mares' urine.

The content of the water-soluble oestrogenic substances present in the concentrates was determined by known methods of chemical or biological assay. For example, a concentrate was found by chemical assay to contain 11 milligrams of conjugated oestrogens per milliliter expressed, for convenience, as sodium oestrone sulphate. When assayed biologically by administration orally in an aqueous solution twice daily for 3 days to adult ovariectomized rats, a total dose of about 0.009 milliliter of one of these concentrates produced vaginal cornification in about 50% of the animals tested.

Based on their oestrogen contents, these concentrates were approximately from 2 to 4 times more active, when administered orally to the adult ovariectomized rat, than is an equivalent amount of free or unconjugated oestrone. The isolated oestrone sulphate, either as the barium, sodium or quinidine salt, was similarly at least twice as active as an equivalent amount of unconjugated oestrone, when assayed orally on adult ovariectomized rats.

These concentrates as such, or after further purification, when administered to patients in amounts corresponding to about 1.25 milligrams of conjugated oestrogens (expressed as sodium oestrone sulphate) daily, were effective in most cases to give substantially complete relief from the common, autonomic, emotional and mental complaints of the menopausal syndrome.

EXAMPLE 2

Three gallons of stallions' urine were processed by substantially the same procedure as outlined in Example 1. Sixty milliliters of a concentrate were prepared containing substantially all the water-soluble oestrogenic substances of the original stallions' urine and possessing adrenal cortical-like activity. The concentrate was further purified as described in the previous example.

EXAMPLE 3

Several procedures were carried out substantially according to Example 1 in which the eluting agent was held constant and the adsorbent varied.

The relative potency obtained is expressed in the following table.

Table I

| Adsorbent Used | Eluting Agents Used | Relative Potency Obtained |
|---|---|---|
| PREGNANT MARES' URINE | | |
| Charcoal | 90% Pyridine (in H₂O) | Per cent 100 |
| Calcium triphosphate | do | 6 |
| Fuller's earth | do | 6 |

EXAMPLE 4

Several procedures were carried out substantially according to Example 1 in which various eluting agents were used to remove the potency from the charcoal adsorbent. The relative potency obtained by the use of the different solvents in the different procedures is expressed in the following table under section (a). Section (b) of Table II discloses the variation of potencies obtained by varying the amount of pyridine in the water.

Table II

| Adsorbent Used | Eluting Agent Used | Relative Potency Obtained |
|---|---|---|
| (a) PREGNANT MARES' URINE | | |
| Charcoal | 90% pyridine (in H₂O) | Per cent 100 |
| Do | 99% Aniline (in H₂O) | 45 |
| Do | 99% Morpholine (in H₂O) | 50 |
| Do | 90% Quinoline (in H₂O) | 100 |
| Do | 30% Monoethylamine (in H₂O) | 57 |
| Do | Normal Butylamine | 71 |
| Do | Normal amylamine | 73 |
| (b) PREGNANT MARES' URINE | | |
| Charcoal | 90% Pyridine (in H₂O) | 100 |
| Do | 50% Pyridine (in H₂O) | 52 |
| Do | 20% Pyridine (in H₂O) | 17 |

According to the invention, there are produced water-soluble hormonal substances containing substantially all the water-soluble oestrogenic substances normally present in the urine of the pregnant mare or of the stallion in the form of an aqueous concentrate or as a dry powder. This concentrate or powder has high oral oestrogenic activity and other biological activity. For instance, it has adrenal cortical-like activity and is particularly useful when administered orally in the therapy of menopausal conditions not only for its high oral oestrogenic activity, but also for its inherent ability to induce a feeling of well being in the patient without producing undesirable side effects. It contains a very small proportion of the original urinary solids and can be used in this state or after further purification.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

We claim:

1. A process for preparing a water-soluble oestrogenically active therapeutic product effective upon oral administration to alleviate the menopausal syndrome in humans, comprising the steps of, contacting unhydrolyzed equine urine under conditions effective to prevent hydrolysis with an adsorbent to obtain a concentrate of desired principles on said adsorbent, thereby to form a concentrate containing a water-soluble oestrogenic substance, extracting said concentrate with liquid containing an organic nitrogen containing base effective to remove preferentially the active principles under conditions to prevent hydrolysis thereby to obtain an extract containing said substance, and concentrating said extract under conditions to prevent hydrolysis.

2. A process, according to claim 1, wherein the concentrated extract is subjected to washing with benzol.

3. A process, according to claim 1, wherein the concentrated extract is subjected to washing with ether.

4. In a process for preparing a water-soluble oestrogenically active therapeutic product effective upon oral administration to alleviate the menopausal syndrome in humans, wherein unhydrolyzed equine urine is contacted with an adsorbent to obtain a concentrate of desired principles in said adsorbent, the steps comprising contacting said concentrate with a liquid containing an organic nitrogen-containing base under conditions to prevent hydrolysis, separating the solution of active principles, concentrating the solution at a temperature below about 50° C. while maintaining said solution neutral to alkaline in reaction to remove substantially all of said solvent without hydrolyzing said active principles.

5. A pharmaceutical product effective by oral administration comprising, substantially all of the water-soluble oestrogenically orally active substances contained in unhydrolyzed equine urinary liquids, characterized by its substantial solubility in water and its substantial insolubility in benzol and ether, its ability to produce vaginal cornification in adult ovariectomized rats and its ability to alleviate the menopausal syndrome in humans, said product also being highly stable in storage and therapeutically non-toxic.

6. The pharmaceutical product, according to claim 5, which is an aqueous concentrate.

7. The pharmaceutical product, according to claim 5, which is in desiccated form.

8. The process, acording to claim 1, wherein the equine urine is pregnant mare's urine.

9. The process, according to claim 1, wherein the nitrogen-containing base is pyridine.

10. The process, according to claim 4, wherein the equine urine is derived from pregnant mares.

11. The process, according to claim 4, wherein the nitrogen-containing base is pyridine.

12. A pharmaceutical product effective by oral administration, comprising substantially all of the water-soluble oestrogenically orally active substances contained in unhydrolyzed pregnant mare's urine, characterized by its substantial solubility in water and its substantial insolubility in benzol and ether, its ability to produce vaginal cornification in adult ovariectomized rats and its ability to alleviate the menopausal syndrome in humans, said product also being highly stable in storage and therapeutically non-toxic.

ARTHUR STANLEY COOK.
GORDON A. GRANT.

REFERENCES CITED

The following references are of record in the file of this patent:

UNITED STATES PATENTS

| Number | Name | Date |
|---|---|---|
| 1,969,608 | Haussler | Aug. 7, 1934 |
| 2,030,210 | Hisaw et al. | Feb. 11, 1936 |
| 2,196,295 | Eberlein | Apr. 9, 1940 |

FOREIGN PATENTS

| Number | Country | Date |
|---|---|---|
| 298,610 | Great Britain | Oct. 9, 1928 |
| 310,056 | Great Britain | July 17, 1930 |
| 470,400 | Great Britain | Aug. 10, 1937 |

OTHER REFERENCES

Edson et al. in J. Biol. Chem. 1939, vol. 130, pages 579–583. (Copy in Pat. Off. Libr. and 167–74.5.)